United States Patent
Hou

(10) Patent No.: US 8,213,452 B2
(45) Date of Patent: Jul. 3, 2012

(54) OPTIMIZED SCHEDULING METHOD USING ORDERED GRANTS FROM A CENTRAL CONTROLLER

(75) Inventor: Victor T. Hou, La Jolla, CA (US)

(73) Assignee: Broadcom Corporation, Irvine, CA (US)

( * ) Notice: Subject to any disclaimer, the term of this patent is extended or adjusted under 35 U.S.C. 154(b) by 1225 days.

(21) Appl. No.: 11/488,109

(22) Filed: Jul. 18, 2006

(65) Prior Publication Data

US 2008/0019397 A1    Jan. 24, 2008

(51) Int. Cl.
*H04B 7/212* (2006.01)
(52) U.S. Cl. ......................................... 370/442; 370/458
(58) Field of Classification Search .................. 725/111, 725/114, 121, 138, 139, 144; 370/420, 430–2, 370/436–8, 442–3, 458
See application file for complete search history.

(56) References Cited

U.S. PATENT DOCUMENTS

| 5,751,708 | A  | * | 5/1998  | Eng et al. .................. 370/395.42 |
| 6,263,359 | B1 |   | 7/2001  | Fong et al. |
| 6,956,865 | B1 | * | 10/2005 | Khaunte et al. ............... 370/442 |
| 2002/0041570 | A1 | * | 4/2002  | Ptasinski et al. .............. 370/252 |
| 2003/0103527 | A1 |   | 6/2003  | Beser |
| 2003/0187931 | A1 | * | 10/2003 | Olsen et al. .................... 709/205 |
| 2004/0160936 | A1 |   | 8/2004  | Liu et al. |
| 2004/0163120 | A1 | * | 8/2004  | Rabenko et al. ............... 725/111 |

FOREIGN PATENT DOCUMENTS

| KR | 1998-0086596 A | 12/1998 |
| KR | 2004-0073936 A | 8/2004 |

OTHER PUBLICATIONS

Search Report for European Application No. 07004700.6-1525 completed on Nov. 6, 2007, 3 pgs.

* cited by examiner

*Primary Examiner* — Derrick Ferris
*Assistant Examiner* — Peter Cheng
(74) *Attorney, Agent, or Firm* — Sterne, Kessler, Goldstein & Fox PLLC

(57) ABSTRACT

A method, system, and computer program product for ordering grants of upstream bandwidth in a two-way grant-based communication system, such as a DOCSIS-based communication system. Typically, a central controller, such as a CMTS, sends a grant message to a set of end user devices, e.g., cable modems, wherein the message defines when each end user device can transmit upstream. The invention first determines, for each end user device, the time needed for processing the grant message. The central controller then constructs the grant message, such that grants for the end user devices associated with the shortest grant message processing times occur early in the grant message and represent the earliest grants. Grants for end user devices associated with the longest grant message processing times occur later in the grant message and represent later grants. With this ordering of grants within the grant message, the CMTS can assume a smaller processing time for processing the grant message by CMs, such that the grant message does not have to be sent so far in advance. Performance of the system is increased due to decreased roundtrip delay.

14 Claims, 9 Drawing Sheets

OPTIMIZED SCHEDULING METHOD USING ORDERED GRANTS FROM A CENTRAL CONTROLLER

BACKGROUND OF THE INVENTION

1. Field of the Invention

The invention described herein relates to bandwidth management, and relates in particular to the provision of bandwidth allocation information to user devices.

2. Background Art

Communications over a cable infrastructure can be governed by a version of the Data Over Cable Service Interface Specification (DOCSIS). In a DOCSIS-based system, or in any two-way grant-based system, communication from an end user device (such as a cable modem, or CM) to a central controller (such as a cable modem termination system, or CMTS) is known as upstream communication. Generally, if a cable modem wishes to transmit upstream, it first makes a request to the central controller, stating the amount of data it wants to send. Because several CMs may be seeking upstream bandwidth, the request may be made in upstream contention opportunities. Requests can also be made as piggybacked requests that are included in the header of an upstream data transmission.

In scheduling upstream transmissions, a CMTS needs to consider the various upstream requests from CMs along with the necessary scheduling of unsolicited grants for applications like voice over internet protocol (VoIP), synchronization, ranging opportunities, and request opportunities. For each upstream channel, the CMTS sends a grant message in the downstream (called a MAP message in DOCSIS). This message defines the various upstream transmission opportunities on that upstream channel over an interval of time. The opportunities may consist of grants to individual CMs, ranging opportunities to individual CMs, request opportunities to particular CMs, broadcast ranging opportunities, broadcast request opportunities to multiple CMs, or any mix of these. The MAP message is the "map" through which the CMTS conveys how the upstream bandwidth is to be used for a particular upstream channel over a defined interval of time. This message states when, for a given upstream channel, each CM is permitted to transmit. CMs must receive the MAP message applicable to the upstream channel(s) that they are utilizing. Each CM then processes the MAP message to find specific transmission opportunities (time slot(s) or a combination of timeslots and spreading codes) that are applicable to or usable by the CM, and to prepare for upstream transmission. A CM therefore needs to have completed processing a MAP prior to the time at which the CM is to transmit upstream, this time having been granted and specified in the MAP.

DOCSIS versions 1.0, 1.1, and 2.0 currently specify a parameter known as MAP processing time. In order for the CMTS to determine how early to send a MAP message in advance of the time allocations stated therein, several delay components are considered. One of the delay components is the time required by the CM to process the MAP and to prepare for a burst transmission upstream. This time delay is generally referred to herein as the grant message time (or MAP processing time, in the DOCSIS context). DOCSIS 1.0 bound the MAP processing time to 200 microseconds. In DOCSIS 2.0, additional time was added to the 200 microseconds for cases in which upstream byte interleaving was enabled for time division multiple access (TDMA), or when synchronous code division multiple access (S-CDMA) mode was used. The DOCSIS 2.0 specifies exactly how to calculate this additional latency, which is added to the 200 microseconds. The sum is still referred to as MAP processing time.

For further advances to DOCSIS, such as that being worked on for the DOCSIS 3.0 project, it is expected that additional time will have to be specified for MAP processing time. One of the reasons is that in DOCSIS 3.0, a CM may use multiple upstream channels in a scheme known as upstream channel bonding. Thus, a CM may be processing multiple MAP messages for different upstream channels at the same time. In addition, a CM may have processing that must be done ahead of time, prior to transmission upstream. In DOCSIS 3.0, for example, continuous concatenation and fragmentation (CCF) may be implemented, requiring such advance processing.

Because different CMs may operate under different DOCSIS versions, CMs may therefore have different processing times for a given MAP message. In addition, different CMs may have different manufacturers, different architectures, and different processors, further affecting MAP processing times.

The conventional solution to this is to send the MAP message sufficiently early, so that all CMs will have completed MAP processing prior to the first grant. This assures that all CMs will be ready to transmit in their allotted time allocations. In fact, this approach assures that all CMs will have completed MAP processing prior to any of the granted timeslots.

While this approach solves the problem of making sure that each CM will be ready to transmit before its allotted time, this approach is also inefficient. The roundtrip between the transmission of a MAP message from a CMTS to a CM, and the transmission upstream by the CM in the allotted bandwidth, can take considerable time for a given CM. A CM may have to wait in an idle state for an extended period between completion of MAP processing and the time at which it can transmit upstream.

What is needed, therefore, is a system and method by which this roundtrip can be reduced, thereby providing more efficient use of time and bandwidth in the allocation of upstream grants to devices such as cable modems.

BRIEF SUMMARY OF THE INVENTION

The invention described herein includes a method, system, and computer program product for ordering grants of upstream bandwidth in a two-way grant-based communication system, such as a DOCSIS-based system. Typically, a central controller, such as a CMTS, sends a grant message to a set of end user devices, e.g., cable modems, wherein the message defines when each end user device can transmit upstream. The invention begins processing by first determining, for each of the end user devices, the time required to process the grant message. As the phrase is used herein, "processing the grant message" is defined broadly to include the processing of the grant message by the end user device, plus the device's preparation to transmit upstream. The central controller then constructs the grant message, such that grants for the end user devices associated with the shortest grant message processing times occur early in the grant message and represent the earliest grants. Grants for end user devices associated with the longest grant message processing times occur later in the grant message and represent later grants. The central controller then sends the grant message to the end user devices at a time that allows each end user device sufficient time to complete processing of the grant message for its granted timeslot. The timing of the transmission of the grant message can be such that the "roundtrip" (between sending the grant message from the central controller and transmission upstream by an end user) is reduced. In an embodiment of the invention, the transmission of the grant message can be delayed, while still allowing each end user device sufficient time to complete processing of the grant message for its granted timeslot.

Further features and advantages of the present invention as well as the structure and operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

Figure 1:
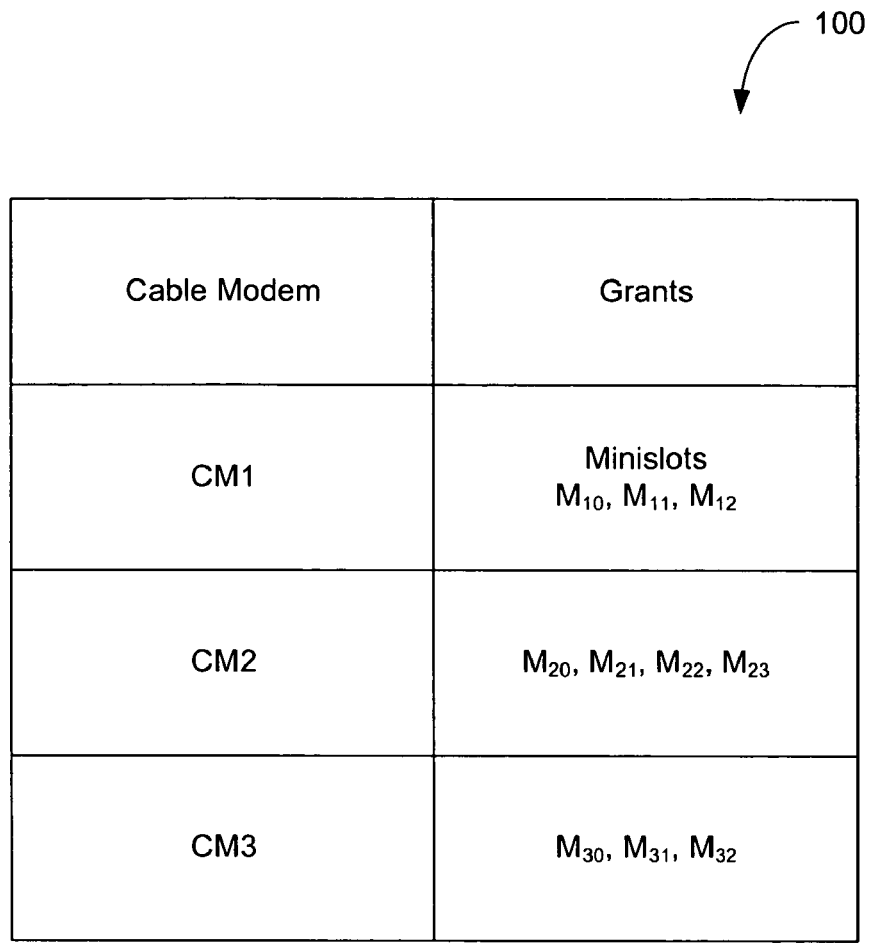
FIG. 1 is a simplified illustration of a MAP message. Additional information that is typically included in a MAP message for each grant, such as the service ID and the interval usage code (IUC), is not shown.

Further embodiments, features, and advantages of the present invention, as well as the operation of the various embodiments of the present invention, are described below with reference to the accompanying drawings

DETAILED DESCRIPTION OF THE INVENTION

Embodiments of the present invention are now described with reference to the figures, where like reference numbers indicate identical or functionally similar elements.

Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

The invention described herein includes a method, system, and computer program product for ordering grants of bandwidth in two-way grant-based communications systems. The invention could be applied, for example, to the granting of upstream bandwidth in a DOCSIS-based communication system. Typically, a central controller, such as a CMTS, sends a grant message to a set of end user devices, e.g., cable modems, wherein the message defines when each end user device can transmit upstream. The invention begins by first determining, for each of the end user devices, the time required for processing of the grant message. As the phrase is used herein, "processing the grant message" is defined broadly to include the processing of the grant message by the end user device, plus the device's preparation to transmit upstream. The central controller then constructs the grant message, such that grants for the end user devices associated with the shortest grant message processing times occur early in the grant message and represent the earliest grants. Grants for end user devices associated with the longest grant message processing times occur later in the grant message and represent later grants. The central controller then sends the grant message to the end user devices in manner that allows each end user device time to complete processing of the grant message in time for its granted timeslot. The invention allows shortening of the time that would otherwise be needed for a roundtrip, i.e., the time between sending a grant message to an end user and the time at which the end user completes the upstream transmission associated with the grant.

While many of the examples below are discussed in terms of a DOCSIS-based system having cable modems, a CMTS, and using a MAP message to grant bandwidth, it should be understood that the concepts described herein are equally applicable to other two-way communication systems. Such a system may have an end user device analogous to a cable modem, a central controller analogous to a CMTS, and a grant message analogous to a MAP message.

An example of a grant message, known as a MAP message in the context of a DOCSIS system, is illustrated in FIG. 1. This is a conceptual representation of such a message, and shows the upstream bandwidth granted to each of three cable modems, CM1, CM2, and CM3. Additional information that is typically included in a MAP message for each grant, such as the service ID and the interval usage code (IUC), is not shown. Each grant is identified as a series of time intervals, called "minislots." In the notation used herein, $M_{ij}$ refers to the jth minislot allocated to cable modem CMi. Cable modem CM1 is granted minislots $M_{10}$, $M_{11}$, and $M_{12}$. Cable modem CM2 is granted minislots $M_{20}$, $M_{21}$, $M_{22}$, and $M_{23}$. Cable modem CM3 is granted minislots $M_{30}$, $M_{31}$, and $M_{32}$. Each cable modem is permitted to transmit upstream in the designated minislots.

Figure 2:
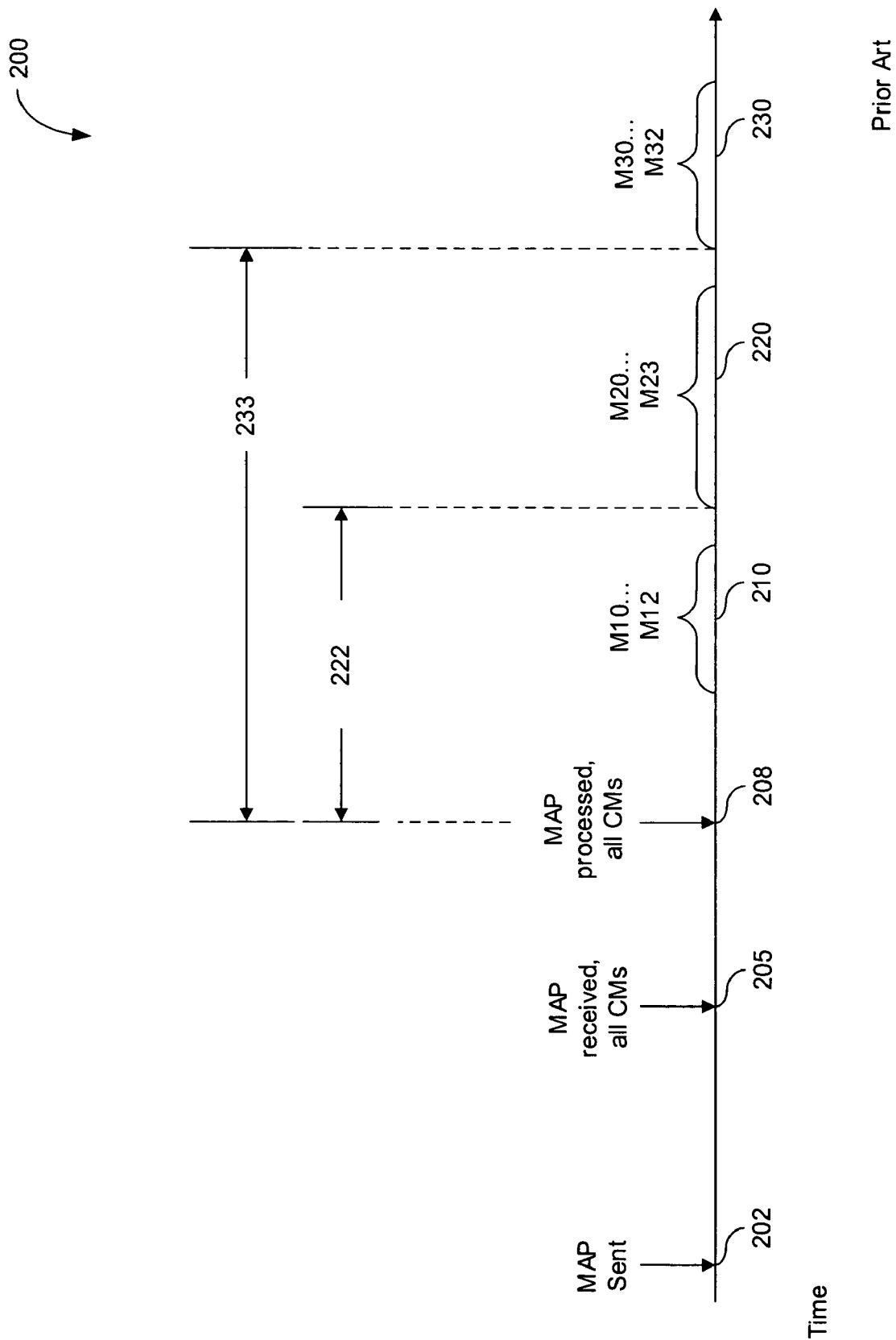
FIG. 2 illustrates the timing of the transmission of the MAP message of FIG. 1, along with the timing of subsequent events, including the receipt and processing of the MAP message by the recipient cable modems.

FIG. 2 is a timeline illustrating the points in time at which MAP message 100 is sent, received, and processed. At point 202, the MAP message is sent from the central controller, e.g., a CMTS. At point 205, the MAP message has been received by all cable modems to which the MAP message was addressed. Not all CMs will have received the message at the same time, but by point 205 the MAP message will have been received by all the CMs. At point 208, all cable modems have completed processing the transmitted MAP message. Not all CMs will have completed processing of the MAP message simultaneously, but by point 208 all CMs will have completed MAP message processing.

Time interval 210 represents minislots $M_{10}$, $M_{11}$, and $M_{12}$. Interval 210 represents the time interval during which cable modem CM1 is permitted to transmit upstream, as shown in FIG. 1. Likewise, interval 220 represents the time interval during which cable modem CM2 is permitted to transmit upstream; interval 230 represents the time interval during which cable modem CM3 is permitted to transmit upstream.

FIG. 2 represents the timing of the transmission of a MAP message, as performed in the traditional approach. MAP message 100 has been processed by all cable modems at point 208. It is only after all cable modems have completed processing the received MAP message that the first granted upstream bandwidth is available in time interval 210.

In current practice, the MAP message is sent at point 202, which is sufficiently early to allow all cable modems to complete MAP processing prior to the earliest grant (interval 210). This is a relatively inefficient arrangement, however. For example, even though CM2 has completed processing the MAP message at point 208, if not earlier, CM2 must wait for an interval 222 before it can take advantage of the granted bandwidth. Likewise, CM3 must wait for an interval 233 to pass before it can transmit in its allocated bandwidth. Intervals 222 and 233 therefore represent time that is lost to cable modems CM1 and CM2, respectively.

The invention described herein represents an alternative to the traditional approach to the ordering and sending of grants in a grant message. The invention takes advantage of the fact that different cable modems will complete processing of a grant message at different points in time. If the grant message is arranged such that the earliest grants are given to end user devices that complete processing of the message earliest, then the grant message can actually be sent later in time, closer to the time of the actual grants. This reduces the roundtrip time interval (between the time a grant message is sent and the time that an end user device transmits upstream). The resulting reduction in this time interval allows a more efficient grant allocation process, and more efficient use of bandwidth.

Figure 3:
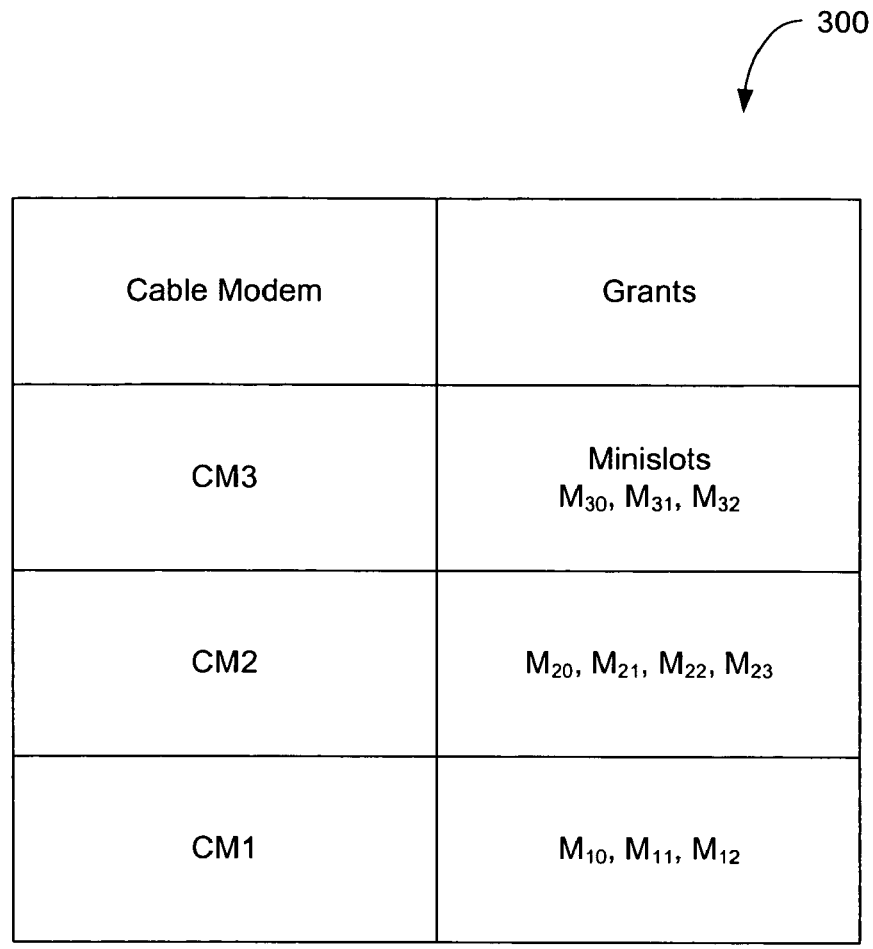
FIG. 3 illustrates a MAP message, according to an embodiment of the invention. As in the case of FIG. 1, additional information that is typically included in a MAP message for each grant, such as the service ID and the interval usage code (IUC), is not shown.

FIG. 3 illustrates another example grant message, one that is constructed according to an embodiment of the invention. Here, cable modem CM3 completes processing the MAP message soonest, relative to the other cable modems. Cable modem CM2 completes its processing of the MAP message later; cable modem CM1 completes its processing of the MAP message even later. Cable modem CM3 is therefore granted the earliest mini-slots, $M_{30}$ through $M_{32}$. Cable modem CM2 is granted mini-slots $M_{20}$ through $M_{23}$. Cable modem CM1 is granted the latest mini-slots, $M_{10}$ through $M_{12}$. This arrangement of grants takes advantage of the fact that in this example, cable modem CM3 completes processing the MAP message soonest, while CM1 completes its processing of the MAP message latest.

Figure 4:
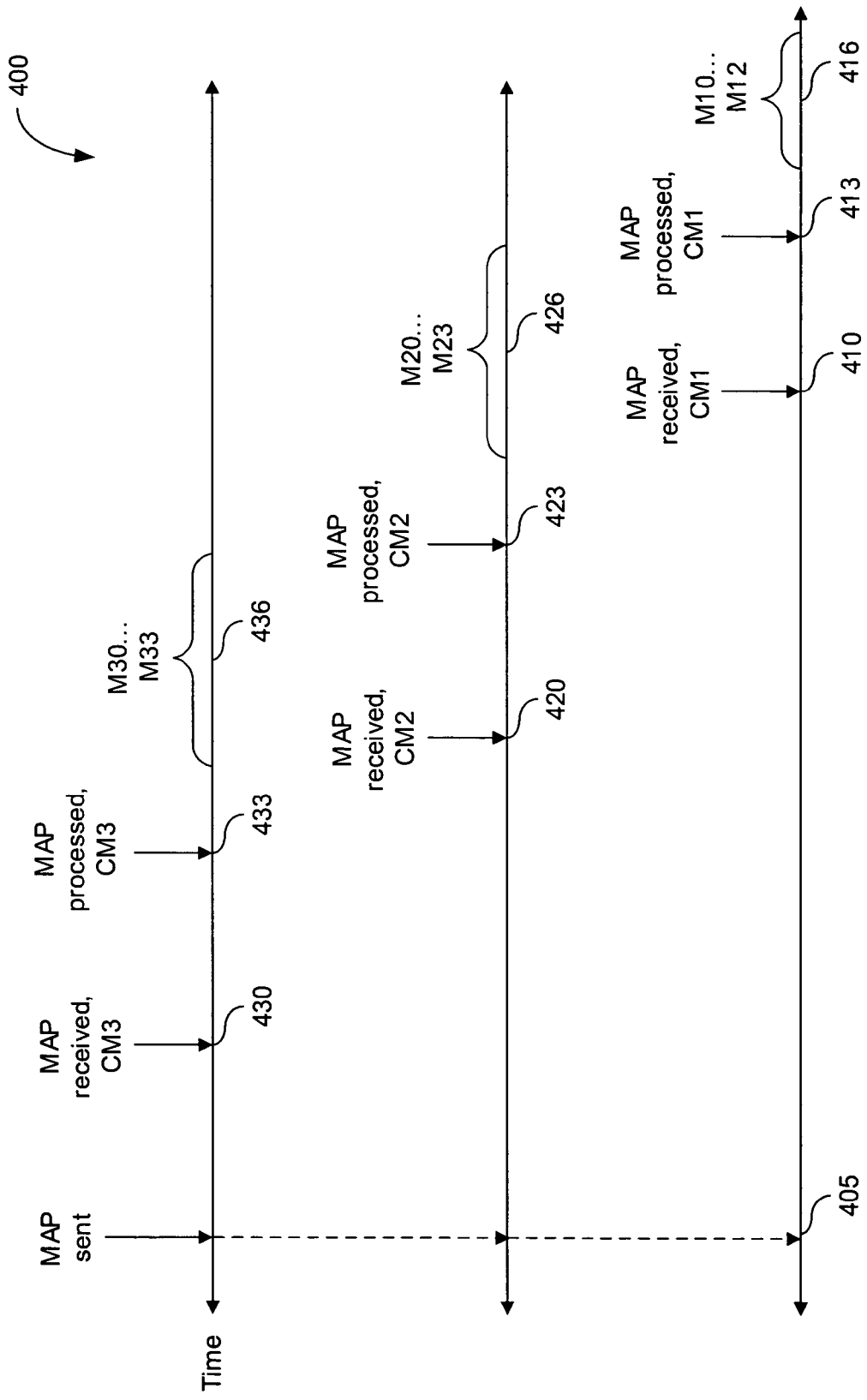
FIG. 4 is a timing diagram, showing the transmission of a MAP message, and the receipt and processing of the MAP message at each of three cable modems, according to an embodiment of the invention.

This is illustrated in FIG. 4. The MAP message is sent at time 405. This time is chosen to reduce the time between the time that a cable modem completes processing of the MAP message and the time of its grant. This arrangement takes advantage of the fact that cable modem CM3 completes processing of the MAP at time 433, while cable modem CM2 completes processing of the MAP at a later time 423. Cable modem CM1 completes its processing of the MAP message at a later time still, time 413. Cable modem CM3 therefore completes processing of the MAP message at time 433, and can then transmit upstream during time interval 436. In this example, cable modem CM2 completes processing of the MAP message at time 423. Cable modem CM2 can then transmit during interval 426. Cable modem CM1 completes processing of the MAP message at time 413. Cable modem CM1 can then transmit upstream during granted interval 416.

Referring back to FIG. 2, in the traditional approach, the MAP message is sent early enough so that all cable modems can receive and complete processing of the MAP message prior to the earliest grant. In the embodiment of the invention illustrated in FIG. 4, the roundtrip time is reduced. To achieve this, the order of the grants is changed.

The grant that occurs first chronologically (and first in the MAP message) is assigned to the CM which is expected to complete MAP message processing earliest, i.e., CM3. The grant that occurs last chronologically (and last in the MAP message) is assigned to the CM which is expected to complete MAP message processing last, CM1. In addition, the MAP message may be sent at a later time, closer in time to the grants, to take advantage of the fact that different cable modems will complete processing of the MAP message at different times. The result of the arrangement illustrated in FIGS. 3 and 4 is shortened roundtrips and a more efficient grant allocation process.

Figure 5:
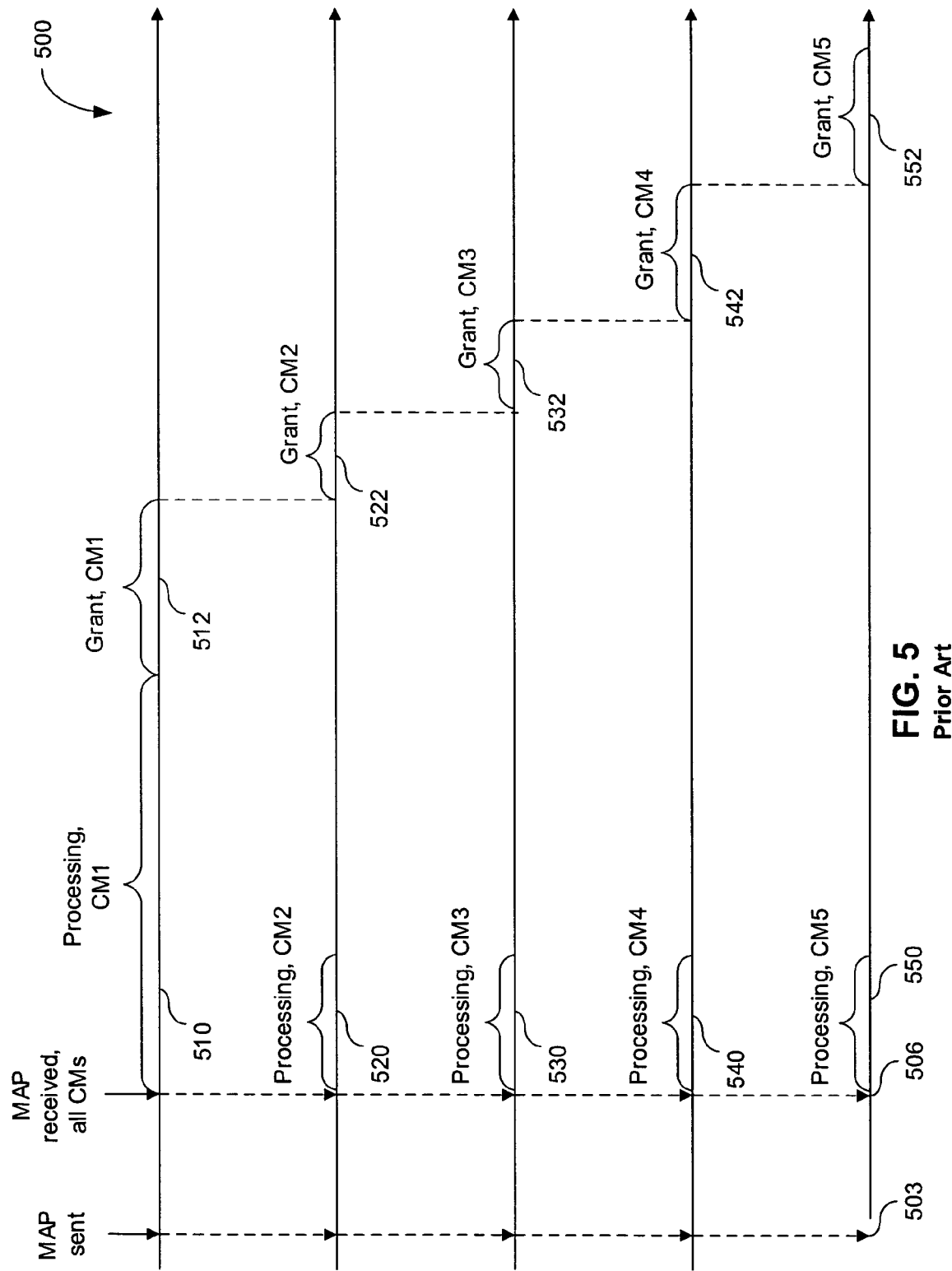
FIG. 5 is a timing diagram illustrating the transmission of a MAP message, followed by the receipt and processing of the MAP message at each of five cable modems, where the MAP message is constructed and transmitted without the benefit of the present invention.
Figure 6:
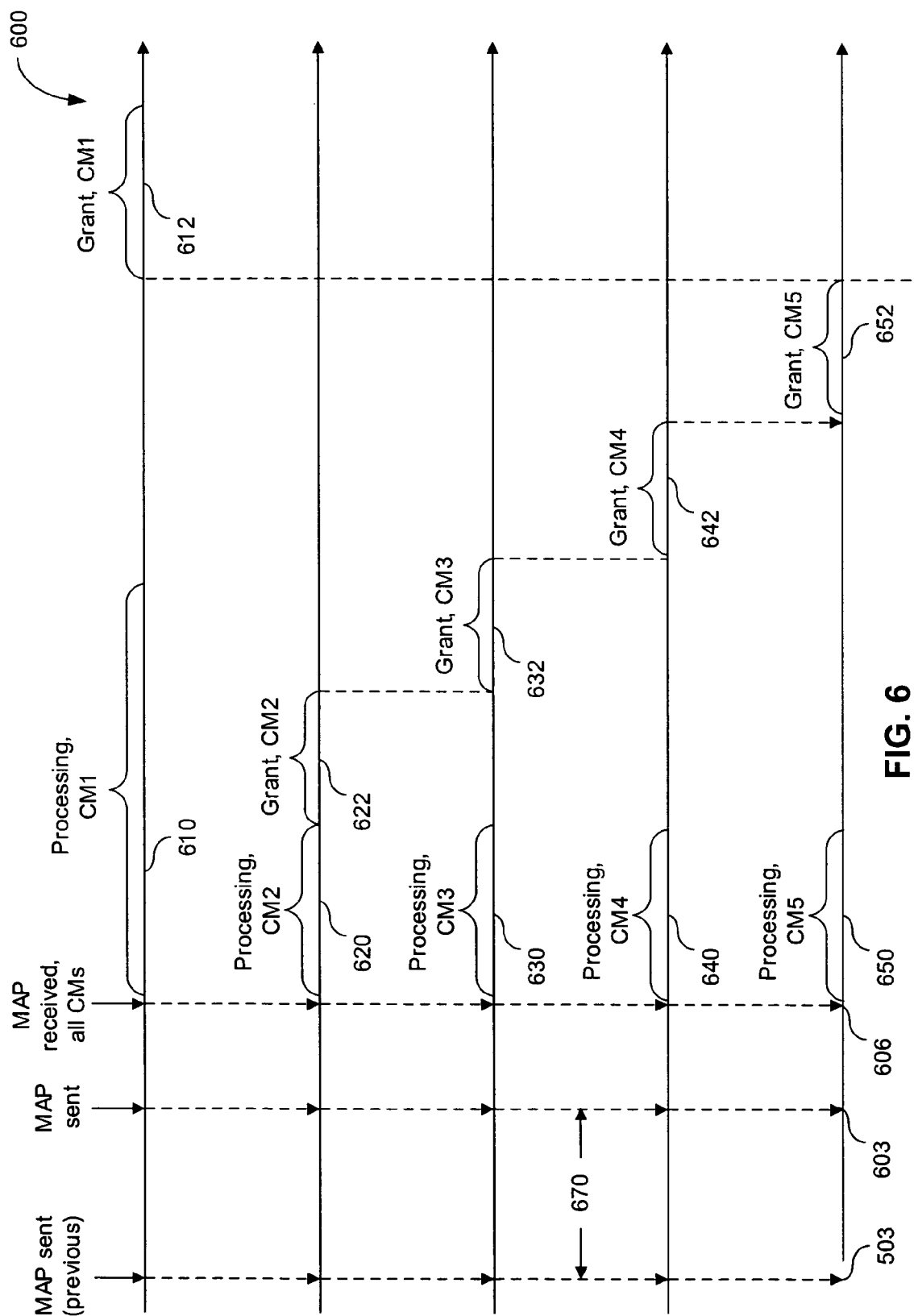
FIG. 6 is a timing diagram illustrating the transmission and receipt of a MAP message at each of five cable modems according to an embodiment of the invention.

A more detailed example is shown in FIGS. 5 and 6. FIG. 5 illustrates the traditional approach. The MAP message is sent to each of cable modems CM1 through CM5 at point 503. In this example, each cable modem receives the MAP message at the same time, point 506. After receipt of the MAP message, cable modem CM1 processes the message during interval 510. Likewise, cable modem CM2 processes the MAP message during interval 520; cable modem CM3 processes the MAP message during interval 530; cable modem CM4 processes the MAP message during interval 540; and cable modem CM5 processes the MAP message during interval 550. Note that cable modem CM1 has the longest processing time of all the cable modems. According to the traditional approach, the time at which the MAP message is sent, point 503, is chosen to be early enough so that all cable modems can complete processing of the MAP message prior to the first grant, interval 512. The interval 512 therefore occurs after completion of the longest processing interval, interval 510. Cable modem CM1 can then transmit upstream during interval 512. Cable modem CM2 can transmit upstream during interval 522; cable modem CM3 can transmit upstream during time interval 532; cable modem CM4 can transmit upstream during time interval 542; and cable modem CM5 can transmit upstream during time interval 552.

The grant process according to an embodiment of the invention is illustrated in FIG. 6. Here, the grants of FIG. 5 have been reordered. The grant to cable modem CM2 now occurs first. The grant to cable modem CM1 now occurs last. This reordering takes advantage of the fact that cable modem CM2 completes processing of the received MAP message well before cable modem CM1 has completed processing of this message. The reordering of the grants allows the MAP message to be sent at a later time. The time at which the MAP message was sent in FIG. 5 is shown again in FIG. 6 as point 503. In the approach according to an embodiment of the invention, the MAP message can now be sent at a later time, point 603. At point 606, the MAP message has been received by all cable modems. Cable modem CM2 is the first cable modem to complete processing of the MAP message. This occurs during time interval 620. After processing, cable modem CM2 can then transmit upstream during its grant interval 622. This grant is followed by grant 632, to cable modem CM3. This is followed by the grants to cable modems CM4 (interval 642), and the grant to cable modem to CM5 (interval 652). Cable modem CM1 is the last to complete processing of the MAP message, during interval 610. The grant to cable modem CM1 occurs during interval 612. This represents the last grant in the MAP message. By rearranging the order of the grants in the MAP message, the central controller takes advantage of the fact that cable modem CM2 has the shortest processing time for a MAP message, and can therefore place the grant from CM2 first in the MAP message. The difference between the time at which the MAP message can be sent as illustrated in FIG. 6 according to the invention, and the time at which the MAP message is sent in the traditional approach as illustrated in FIG. 5, is shown as interval 670 in FIG. 6.

Figure 7:
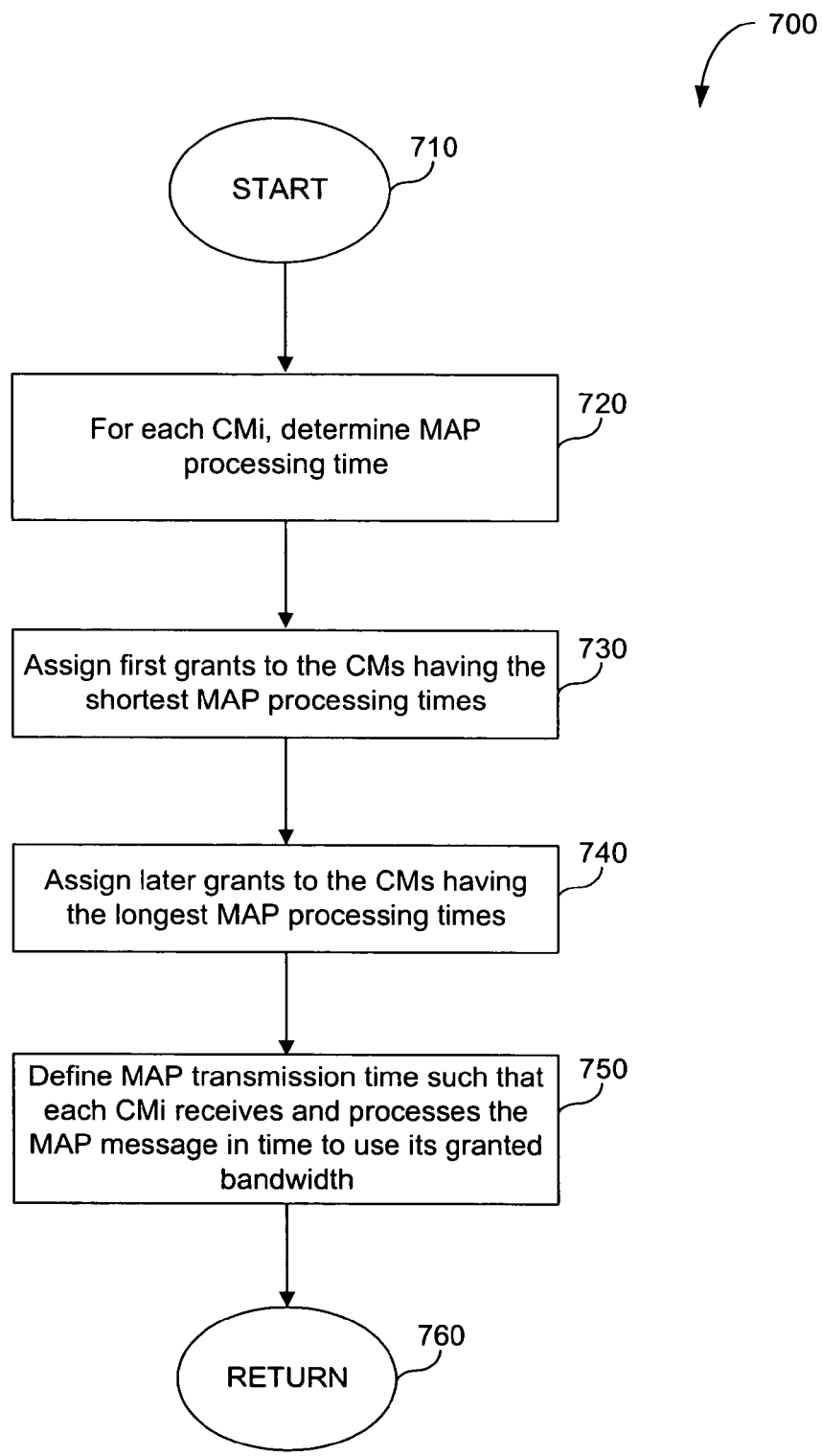
FIG. 7 is a flowchart illustrating the processing of an embodiment of the invention.

The processing of the invention is illustrated generally in FIG. 7. The process starts at step 710. In step 720, for each cable modem CMi, the time required for processing the received MAP message is determined. The time required can be a function of the communications standard being followed (e.g., the DOCSIS version), the processing power of the modem, and/or the overall architecture of the modem. The time required can be determined empirically or provided by a manufacturer. The time required may be stored in advance and accessed by the central controller as needed.

In step 730, the first grants are assigned to those cable modems having the shortest MAP processing times. In step 740, the later grants are assigned to those CMs having the longest MAP processing times. In step 750, the transmission time is defined so that each CMi receives and processes the MAP message in time to use its granted bandwidth. In an embodiment of the invention, the MAP message is sent closer in time to the time of the upstream transmissions than it would have been sent under the traditional approach. In an embodiment of the invention, the transmission time can be defined to be as late as possible, but not so late that the MAP processing at any CMi impinges on the grant to CMi. The process concludes at step 760.

Figure 8:
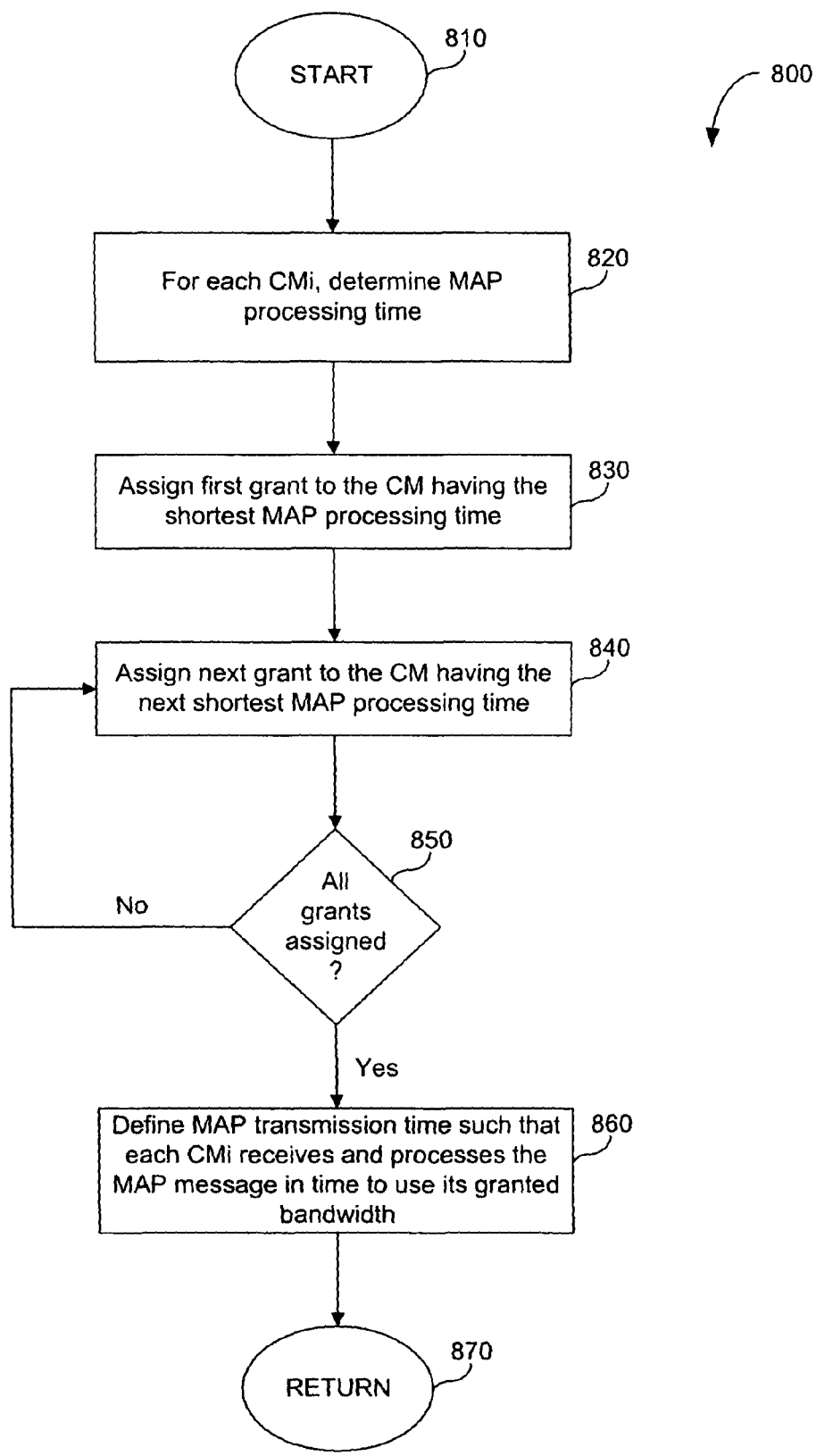
FIG. 8 is a flowchart illustrating the processing of an embodiment of the invention.

The processing of the invention, according to one embodiment thereof, is illustrated in FIG. 8. The process begins at step 810. At step 820, for each cable modem CMi, the time required for processing the received MAP message is determined. In step 830, the first grant of the MAP message is assigned to the cable modem having the shortest MAP processing time. In step 840, the next grant in the MAP message is assigned to the cable modem having the next shortest MAP processing time. In step 850, a determination is made as to whether all the grants have been assigned. If not, then the process returns to step 840, where the next grant is assigned to the cable modem having the next shortest MAP processing time. If, in step 850, it is determined that all grants have now been assigned, then processing continues at step 860. Here, the MAP transmission time is defined. The transmission time is defined so that each CMi receives and processes the MAP message in time to use its granted bandwidth. In an embodiment of the invention, the MAP message is sent closer in time to the time of the upstream transmissions than it would have been sent under the traditional approach. In an embodiment of the invention, the transmission time can be defined to be as late as possible, but not so late that the MAP processing at any CMi impinges on the grant to CMi. The process concludes at step 870.

Any algorithmic approach, whether the one illustrated in FIG. 8 or one used in an alternative embodiment of the invention, may need to be complementary to other scheduling tasks that a CMTS or other central controller must perform. Examples of such tasks include processing of unsolicited grants, attaining/maintaining a certain quality of service (QoS), initial ranging, periodic maintenance, and processing of contention request opportunities. Generally, all other scheduling constraints need to be observed.

Figure 9:
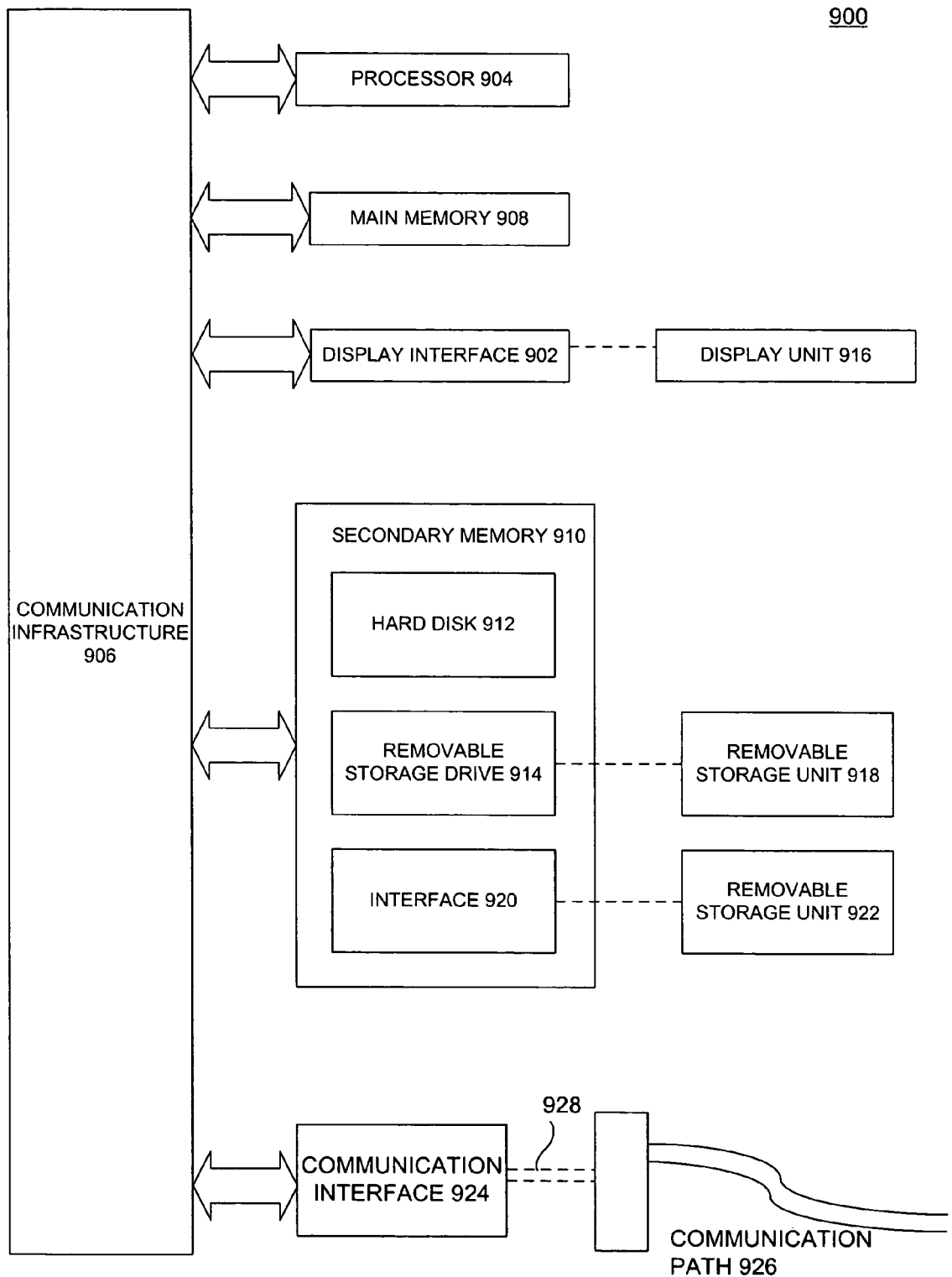
FIG. 9 illustrates a computer system which may be used to implement an embodiment of the invention.

In one embodiment, the invention is directed toward one or more computer systems capable of carrying out the functionality described herein. An example of a computer system 900 is shown in FIG. 9. Such a computing platform would be implemented as part of a CMTS in an embodiment of the invention, and would execute code to format MAP messages, determine transmission times, and output MAP messages as described above.

The computer system 900 includes one or more processors, such as processor 904. The processor 904 is connected to a communication infrastructure 906 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 900 can include a display interface 902 that forwards graphics, text, and other data from the communication infrastructure 906 (or from a frame buffer not shown) for display on the display unit 916.

Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918 represents a floppy disk, magnetic tape, optical disk, etc. which is read by and written to by removable storage drive 914. As will be appreciated, the removable storage unit 918 includes a computer usable storage medium having stored therein computer software and/or data.

In alternative embodiments, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, a flash memory, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928 which may be electronic, electromagnetic, optical or other signals capable of being received by communications interface 924. These signals 928 are provided to communications interface 924 via a communications path (e.g., channel) 926. This channel 926 carries signals 928 and may be implemented using wire or cable, fiber optics, a telephone line, a cellular link, an radio frequency (RF) link and other communications channels. Communications path 926 carries downstream MAP messages in an embodiment of the invention.

In this document, the terms "computer program medium" and "computer usable medium" are used to generally refer to media such as removable storage drive 914 and a hard disk installed in hard disk drive 912. These computer program products provide software to computer system 900. The invention is directed to such computer program products.

Computer programs (also referred to as computer control logic) are stored in main memory 908 and/or secondary memory 910. Computer programs may also be received via communications interface 924. Such computer programs, when executed, enable the computer system 900 to perform the features of the present invention, as discussed herein. In particular, the computer programs, when executed, enable the processor 904 to perform the features of the present invention. Accordingly, such computer programs represent controllers of the computer system 900.

In an embodiment where the invention is implemented using software, the software may be stored in a computer program product and loaded into computer system 900 using removable storage drive 914, hard drive 912 or communications interface 924. The control logic (software), when executed by the processor 904, causes the processor 904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While some embodiments of the present invention have been described above, it should be understood that it has been presented by way of examples only and not meant to limit the invention. It will be understood by those skilled in the art that various changes in form and detail may be made therein without departing from the spirit and scope of the invention as defined in the appended claims. Thus, the breadth and scope of the present invention should not be limited by the above-described exemplary embodiments, but should be defined only in accordance with the following claims and their equivalents

What is claimed is:

1. A method of ordering grants of upstream bandwidth in a two-way grant-based communication system, comprising:
   (a) for each of a plurality of end user devices, determining, at a headend device, a time required for processing of a grant message;
   (b) constructing the grant message at the headend device, such that
      (i) grants for end user devices associated with the shortest grant message processing times occur earliest in the grant message; and
      (ii) grants for end user devices associated with the longest grant message processing times occur later in the grant message;
   (c) sending the grant message from the headend device to the end user devices at a time that allows each end user device to complete processing of the grant message before its grant,
   wherein the communication system comprises a DOCSIS-based communication system, and said grant message comprises a MAP message, and
   wherein said step (b) comprises assigning a first grant of the grant message to the end user device having the shortest grant message processing time.

2. The method of claim 1, wherein said plurality of end user devices comprises a cable modem.

3. The method of claim 1, wherein said step (b) comprises assigning each subsequent grant in order of the grant message processing time of each corresponding end user device, such that a last grant is associated with an end user device having the longest grant message processing time.

4. The method of claim 1, further comprising:
   assigning first time slots to end user devices associated with the shortest grant message processing times, which start before second time slots assigned to end user devices with the longest grant message processing times.

5. The method of claim 1, the sending step further comprising:
   sending the grant message proximate in time to the start of the earliest time slot and based on a shortest grant message processing time by an end user device.

6. The method of claim 1, wherein a grant defines a time slot during which an end user device can transmit upstream.

7. A system for ordering grants of upstream bandwidth in a two-way grant-based communication system, comprising:
   (a) a processor; and
   (b) a memory, in communication with the processor, for storing a plurality of processing instructions that direct the processor to:
      (i) determine, for each of a plurality of end user devices, a time required for processing a grant message;
      (ii) construct the grant message, such that
         (1) grants for end user devices associated with the shortest grant message processing times occur earliest in the grant message, and
         (2) grants for end user devices associated with the longest grant message processing times occur later in the grant message, and
      (iii) determine a time for sending the grant message to the end user devices, where the determined time allows each end user device to complete processing of the grant message before its grant,
   wherein the communication system comprises a DOCSIS based communication system, and wherein said grant message comprises a MAP message, and
   wherein said instructions comprise instructions for directing the processor to assign a first grant of said grant message to the end user device having the shortest grant message processing time.

8. The system of claim 7, wherein said plurality of end user devices comprises a cable modem.

9. The system of claim 7, wherein said instructions further comprise instructions for directing the processor to assign each subsequent grant in order of the grant message processing time of each corresponding end user device, such that a last grant is associated with an end user device having the longest grant message processing time.

10. The system of claim 7, wherein a grant defines a time slot during which an end user device can transmit upstream.

11. A computer program product comprising a non-transitory computer usable medium having control logic stored therein for causing a computer to order grants of upstream bandwidth in a two-way grant-based communication system, said control logic comprising:
   first computer readable program code means which, when the control logic contained therein is executed by the computer, causes the computer to determine a time required for processing the grant message, for each of a plurality of end user devices;
   second computer readable program code means which, when the control logic contained therein is executed by the computer, causes the computer to construct a grant message, such that (i) grants for end user devices associated with the shortest grant message processing times occur earliest in the grant message; and
(ii) grants for end user devices associated with the longest grant message processing times occur later in the grant message; and third computer readable program code means which, when the control logic contained therein is executed by the computer, causes the computer to send the grant message to the end user devices at a time that allows each end user device to complete processing of the grant message before its grant,
wherein the communication system comprises a DOCSIS-based communication system, and wherein said grant message comprises a MAP message, and
wherein said second computer readable program code means comprises program code means which, when the control logic contained therein is executed by the computer, causes the computer to assign a first grant of the grant message to the end user device having the shortest grant message processing time.

12. The tangible computer program product of claim 11, wherein said plurality of end user devices comprises a cable modem.

13. The tangible computer program product of claim 11, wherein said second computer readable program code means comprises program code means which, when the control logic contained therein is executed by the computer, causes the computer to assign each subsequent grant in order of the grant message processing time of each corresponding end user device, such that a last grant is associated with an end user device having the longest grant message processing time.

14. The tangible computer program product of claim 11, wherein a grant defines a time slot during which an end user device can transmit upstream.

* * * * *